United States Patent
Frey

(10) Patent No.: US 11,268,612 B2
(45) Date of Patent: Mar. 8, 2022

(54) METHOD OF MANUFACTURING A COMPOSITE OF A SUN GEAR AND A PLANET CARRIER AND A COMPOSITE MANUFACTURED ACCORDING TO THIS METHOD

(71) Applicant: Maxon International AG, Sachseln (CH)

(72) Inventor: Dominik Frey, Sexau (DE)

(73) Assignee: MAXON INTERNATIONAL AG, Sachseln (CH)

(*) Notice: Subject to any disclaimer, the term of this patent is extended or adjusted under 35 U.S.C. 154(b) by 0 days.

(21) Appl. No.: 17/111,648

(22) Filed: Dec. 4, 2020

(65) Prior Publication Data
US 2021/0172511 A1 Jun. 10, 2021

(30) Foreign Application Priority Data
Dec. 4, 2019 (EP) .................................. 19213598

(51) Int. Cl.
| | |
|---|---|
| *F16H 57/08* | (2006.01) |
| *B23P 19/02* | (2006.01) |
| *F16H 1/28* | (2006.01) |
| *F16H 55/17* | (2006.01) |

(52) U.S. Cl.
CPC .............. *F16H 57/08* (2013.01); *B23P 19/02* (2013.01); *F16H 1/28* (2013.01); *F16H 55/17* (2013.01); *F16H 57/082* (2013.01)

(58) Field of Classification Search
CPC .......... F16H 57/08; F16H 57/082; F16H 1/28; F16H 55/17; B23P 19/02
See application file for complete search history.

(56) References Cited

FOREIGN PATENT DOCUMENTS

| | | | | |
|---|---|---|---|---|
| CN | 101852288 A | | 10/2010 | |
| CN | 204344825 U | | 5/2015 | |
| CN | 104930165 A | | 9/2015 | |
| CN | 206904089 U | * | 1/2018 | ............. F16D 1/087 |
| CN | 209100611 U | | 7/2019 | |
| CN | 110242730 A | | 9/2019 | |
| DE | 102012223226 A1 | | 6/2014 | |
| DE | 102016202753 A1 | | 8/2017 | |
| DE | 102016223820 A1 | * | 5/2018 | ........... F16H 57/023 |
| DE | 102017223092 A1 | | 6/2019 | |
| KR | 20150073833 A | * | 7/2015 | ........... F16H 57/023 |

OTHER PUBLICATIONS

CN206904089 machine translation filed Jul. 29, 2021 (Year: 2021).*
DE102016223820 machine translation filed Jul. 29, 2021 (Year: 2021).*
KR20150073833 machine translation filed Jul. 29, 2021 (Year: 2021).*
Extended European Search Report dated Mar. 16, 2020, issued by the European Patent Office in the corresponding European Patent Application No. 19213598.6-1012. (7 pages).

* cited by examiner

*Primary Examiner* — Tisha D Lewis
(74) *Attorney, Agent, or Firm* — Buchanan Ingersoll & Rooney PC

(57) ABSTRACT

A method of manufacturing a composite including a sun gear and a planet carrier for a planetary gear unit, the sun gear and the planet carrier being manufactured as separate components and then joined together. The two components are joined together by establishing, by deformation, a form-fit connection between the two components.

20 Claims, 4 Drawing Sheets

METHOD OF MANUFACTURING A COMPOSITE OF A SUN GEAR AND A PLANET CARRIER AND A COMPOSITE MANUFACTURED ACCORDING TO THIS METHOD

BACKGROUND

The present invention relates to a method of manufacturing a composite comprising a sun gear and a planet carrier for a planetary gear unit. According to the method of the generic kind, the sun gear and the planet carrier are manufactured as separate components and then joined together.

FIELD OF INVENTION

In multi-stage planetary gear units, the planet carrier of the first stage also constitutes the drive for the second stage of the planetary gear unit. The sun gear of the second stage is therefore non-rotatably connected to the planet carrier of the first stage. It is known from the prior art to manufacture the sun gear and the planet carrier as separate components and to connect them by means of joining methods establishing a material bond, such as welding, soldering or adhesive bonding. From the prior art it is also known to alternatively establish an interference fit between the two components.

The known joining methods establishing a material bond have the disadvantage that the choice of materials is limited, since many materials can only to a limited extent be joined by a material bond. Moreover, many pairs of materials are not, or only to a limited extent suitable for an interference fit.

SUMMARY

It is the object of the present invention to provide a method of manufacturing a composite comprising a sun gear and a planet carrier for a planetary gear unit which ensures a simple and cost-effective production of the composite, while at the same time allowing an optimized selection of materials specific to the respective component.

A method provides a solution according to the present invention for the task in question, when the two components are joined together by establishing, by means of deforming, a form-fit connection between the two components.

The invention allows a simple, cost-effective and fast production of the connection between the two components. Regarding the selection of materials, the flexibility is much higher in comparison with known joining methods. The invention allows pairing of different materials, e.g. metal and ceramics or metal and plastic. The component to be deformed, which is normally the planet carrier, consists preferably of metal. Also the component which is not to be deformed may be produced from metal, or e.g. from plastic or ceramics.

Deforming may be executed e.g. by means of roller burnishing, rolling, crimping, caulking, embossing, bending, folding or kneading.

According to a particularly preferred embodiment of the present invention, deforming takes place by means of roller burnishing.

According to a further particularly preferred embodiment, a force-fit connection, in addition to the form-fit connection, can be established between the two components, preferably in the form of a press-fit connection, so as to improve and strengthen the connection between the components.

According to a further preferred embodiment of the present invention, one of the two components is manufactured with a lug, the other one of the two components being manufactured with a recess, and the lug of one component being, by means of deforming, at least partially deformed into the recess of the other component, so as to establish the form-fit connection between the two components. This allows the form-fit connection to be established extremely easily and quickly.

According to a particularly preferred embodiment, the recess is manufactured as a circumferentially extending groove, the component provided with the circumferentially extending groove being inserted into a bore of the other component, and the lug of the other component being then, at least partially, deformed into the groove. This will provide a particularly reliable form-fit connection in an axial direction.

According to a further particularly preferred embodiment of the present invention, the planet carrier is manufactured with the bore, the sun gear being manufactured with the circumferentially extending groove, and the sun gear comprising a running area provided with a toothing and a shaft area which exists axially outside of the running area and which is adapted to be inserted into the bore of the planet carrier, and the groove being formed in the shaft area.

The groove is preferably an undercut. According to a further embodiment of the present invention, the circumferentially extending groove may be formed in the shaft area of the sun gear e.g. directly adjacent the toothed running area of the sun gear. Alternatively, the shaft area may have a smaller external diameter than the running area, the circumferentially extending groove being formed in the shaft area of the sun gear in spaced relationship with the running area of the sun gear, so that a shoulder is formed between the groove and the running area, and the two components being assembled such that the lug of the planet carrier extends up to the shoulder and covers the shoulder at least partially. Both the shoulder and the shaft area portion existing on the other side of the groove may have a residual toothing into which material of the lug can be forced during deforming, so as to improve the form-fit connection between the two components, so that in particular a transmission of high torques will be possible. According to an exemplary embodiment, the lug may here be forced, at certain points, into the groove and e.g. additionally also into the residual toothing by means of mandrels, thus creating both an axial and a rotational form-fit. This may analogously also be achieved with other deformation tool contours. Form-fit connections can also be produced, when the tool does not move relative to the components (sun gear, planet carrier) during the lug deformation process and when the deformations produced are therefore only partial deformations and no circumferentially extending ones. Also deformation tools that are not rotatable relative to the components are, in particular, suitable for producing this form-fit connection. The lug may also circulate and be forced by means of a tool continuously into the groove and/or the residual toothing.

According to another particularly preferred embodiment of the present invention, the sun gear may initially be manufactured with a toothing provided continuously in an axial direction, the groove being then formed in the sun gear such that the toothing partially continues to exist on a bottom of the groove, and the lug of the planet carrier being deformed into the groove in such a way that a form-fit is established between the toothing on the bottom of the groove and the lug. This will simplify the manufacture of the sun gear on the one hand. On the other hand, also the connection between the two components will be improved in this way. The height of the groove is smaller than the toothing height in the case of this embodiment. The material of the lug is forced, at least partially, into the spaces between the teeth on the bottom of the groove.

According to a further preferred embodiment of the present invention, the sun gear may initially be manufactured with a toothing provided continuously in an axial direction, the toothing continuing to exist, at least partially, in the shaft area, and the lug of the planet carrier being deformed in such a way that a form-fit is established between the toothing in the shaft area and the lug. Also in this embodiment, the form-fit and the connection between the two components is optimized still further.

According to another embodiment of the present invention, the shaft area may be provided with micro-form-fit elements. The micro-form-fit elements may e.g. be serrations or barbs. These may be provided in addition to a toothing or residual toothing existing in the shaft area. When the sun gear is being installed in the planet carrier, the micro-form-fit elements enter the wall of the bore and thus provide an additional micro-form-fit connection. The connection between the two components is thus improved still further.

According to a further preferred embodiment of the present invention, the lug is a hollow-cylindrical projection of the planet carrier, which is circumferentially deformed into the groove of the sun gear. The hollow-cylindrical projection has preferably the same internal diameter as the planet carrier bore that adjoins the projection. According to another preferred embodiment, a circumferentially extending bead is additionally formed in the hollow-cylindrical projection, so as to establish the form-fit connection. Alternatively, the lug may only be formed in segments in the circumferential direction. It is also possible to deform the lug into the groove only in segments. In the latter case, the lug or the hollow-cylindrical projection may have formed therein individual punctiform beads or elongate beads extending in the axial direction.

According to a further specially preferred embodiment of the present invention, the bore and the shaft area are dimensioned such that, when the two components are being assembled, a press-fit connection will be established between the bore and the shaft area. In this way, a particularly reliable connection is created between the two components, thus allowing also the transmission of particularly high torques.

According to a further embodiment of the present invention, the bore may be configured such that it has at least one taper, whose minimum internal diameter is smaller than the external diameter of the shaft area of the sun gear. When joining the sun gear, a toothing or residual toothing existing in the shaft area can be pressed into the taper, so that a negative image of the contour of the shaft area will be created by material displacement or material removal. This results in an additional form-fit connection in the area of the taper.

The present invention also provides a composite comprising a sun gear and a planet carrier, manufactured according to the method disclosed by the present invention.

BRIEF DESCRIPTION OF THE DRAWINGS

Embodiments of the present invention will be explained hereinafter in more detail making reference to drawings, in which.

DETAILED DESCRIPTION

Figure 1:
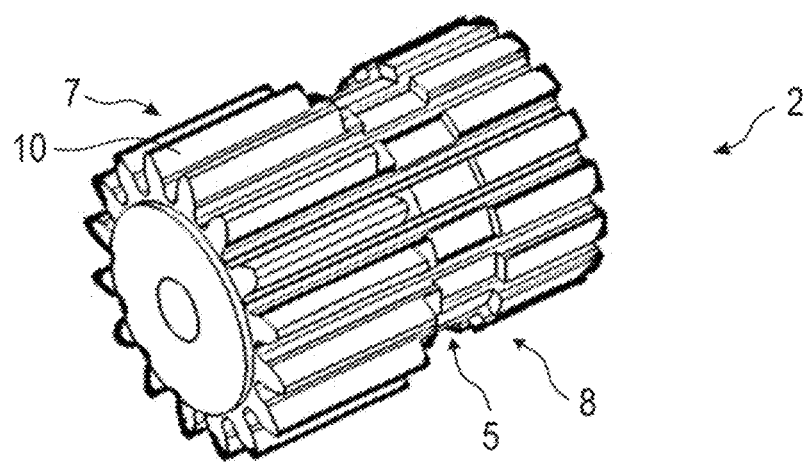
FIG. 1 shows the sun gear of a composite disclosed by the present invention according to a first embodiment in a perspective view.

In the statements following hereinafter, like components will be identified by like reference numerals. If a figure comprises reference numerals, which are not dealt with in detail in the associated description of the figure, reference is made to preceding or subsequent descriptions of figures.

Figure 2:
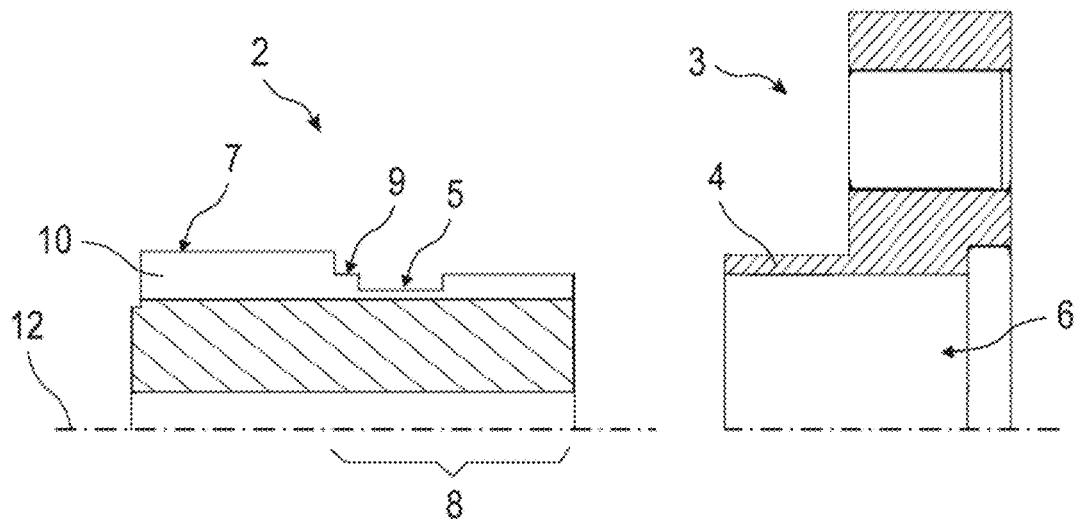
FIG. 2 shows a longitudinal section through the sun gear according to FIG. 1 and an associated planet carrier before the two components are assembled.

FIG. 1 shows a perspective view of a sun gear 2 according to a first embodiment of the present invention. The sun gear has a so-called running area 7, in which a toothing 10 is provided, with which the sun gear 2 can mesh with the planet gears of a next stage of a planetary gear unit. The running area 7 is followed by a so-called shaft area 8 in an axial direction. As will be explained in more detail hereinbelow, the shaft area 8 is used for connection to a suitable planet carrier 3, which is shown in FIG. 2. For manufacturing the sun gear 2, the toothing 10 is first formed over the entire length of the sun gear 2. The shaft area having a reduced diameter in comparison with the initial diameter, and the groove, whose diameter is reduced still further, are then manufactured by subjecting the component to turning. Both in the shaft area itself and in the area of the groove a certain amount of residual toothing remains. This means that, in these two areas, the component is not subjected to turning to such an extent that the toothing is removed completely, but it remains at least up to a certain height. In other words, a certain residual toothing will remain there.

FIG. 2 shows the sun gear 2 and the associated planet carrier 3 in a non-assembled state. Both components share an axis 12. FIG. 2 also shows that a groove 5 is formed in the shaft area 8 of the sun gear 2. The groove 5 extends at a small distance from the running area 7, thus creating a shoulder 9 between the groove 5 and the running area 7.

Figure 3:
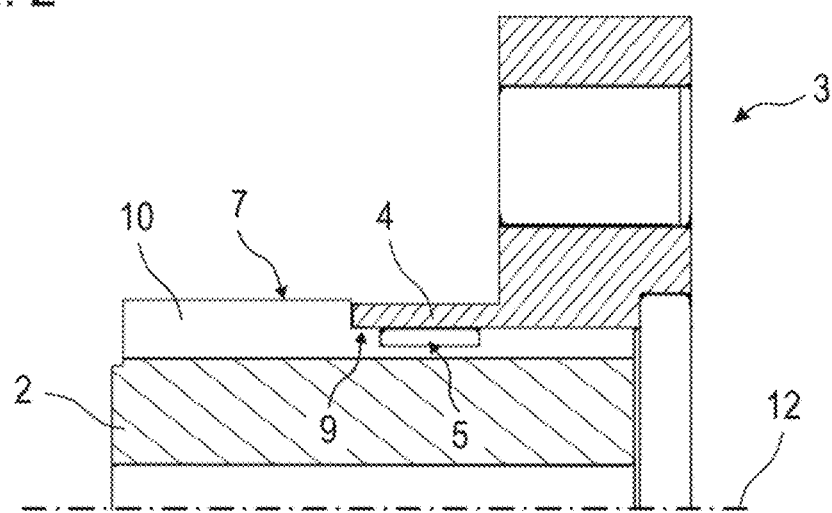
FIG. 3 shows the presentation according to FIG. 2 after the two components have been assembled.

The associated planet carrier 3 has a bore 6 into which the shaft area 8 of the sun gear 2 can be inserted or, in the event that a press-fit connection is desired, pressed in. In extension of the bore 6, so to speak, a hollow-cylindrical projection 4 protrudes from the planet carrier 3, this projection 4 having substantially the same internal diameter as the bore 6 itself. As can be seen in FIG. 3, the hollow-cylindrical projection 4 covers the circumferential groove 5 of the sun gear 2 in the assembled state of the two components. The hollow-cylindrical projection 4 extends up to the shoulder 9 and it also covers this shoulder 9.

FIG. 3 shows the sun gear 2 and the planet carrier 3 in an assembled state before the final deformation step. The hollow-cylindrical projection 4 of the planet carrier 3 has here been attached to the shaft area 8 of the sun gear 2, the hollow-cylindrical projection 4 extending up to the shoulder 9 and covering the groove 5 completely.

Figure 4:
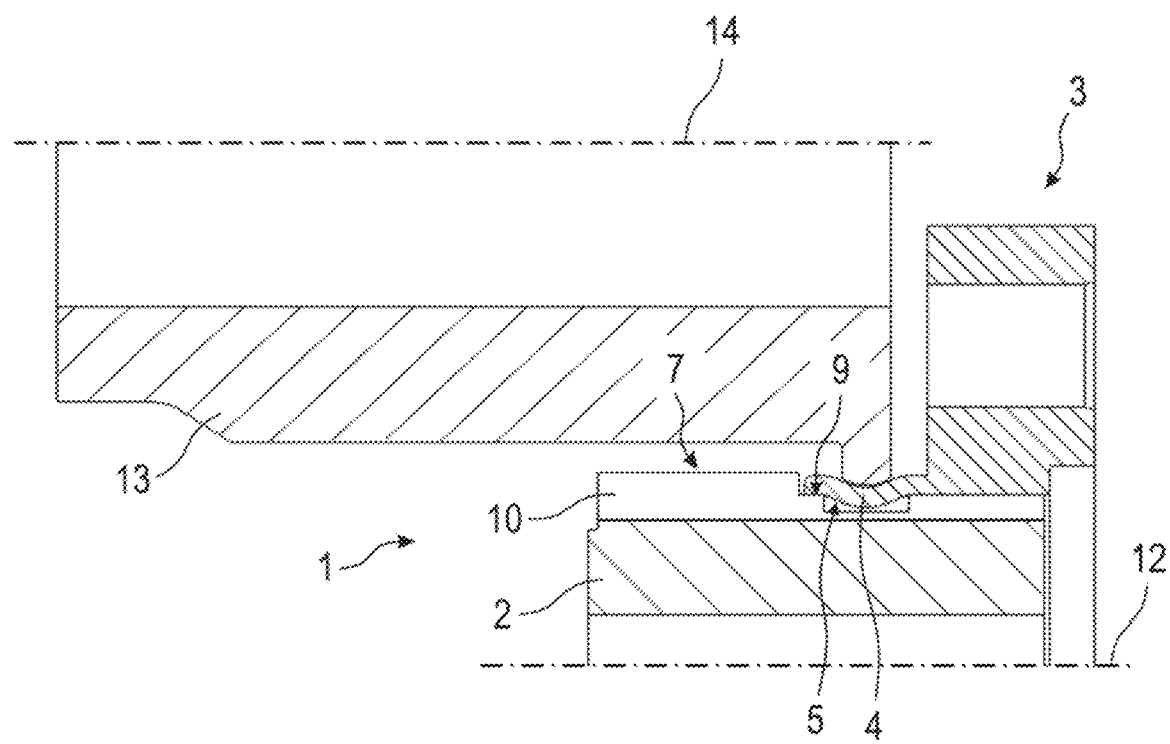
FIG. 4 shows the assembled components according to FIG. 3 with a presentation of the final deformation step carried out by means of a rolling cylinder.

In FIG. 4 the final deformation step of the method according to the present invention is shown. To this end, a circumferentially extending bead is embossed into the hollow-cylindrical projection 4 by means of a rolling cylinder 13 which rotates about its axis 14, the hollow-cylindrical projection being thus, at least partially, deformed into the circumferentially extending groove 5. Due to the residual toothing on the bottom of the groove 5 and in the shaft area 8, the material of the hollow-cylindrical projection is also partially pressed into the spaces between the teeth of the residual toothing, and this results in a particularly tight fit as well as a form-fit connection acting not only in an axial direction but also in a circumferential direction.

Figure 5:
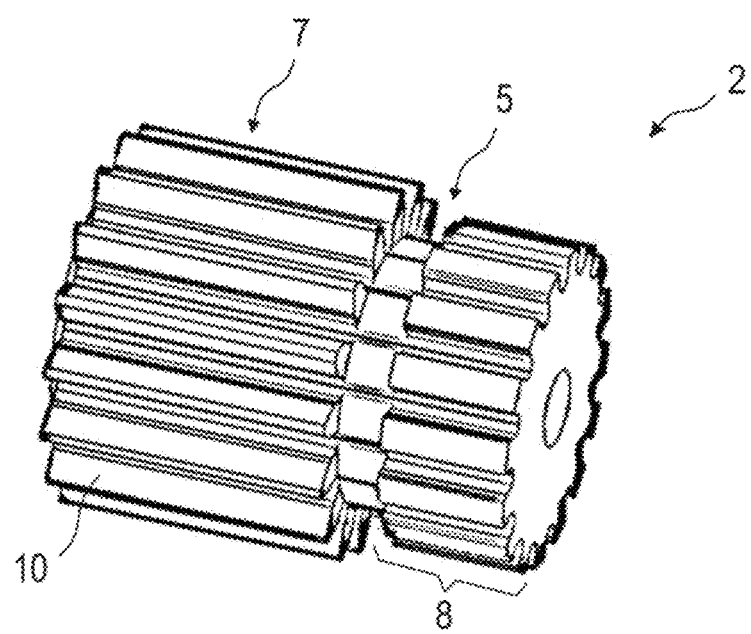
FIG. 5 shows the sun gear of a composite disclosed by the present invention according to a second embodiment in a perspective view.
Figure 6:
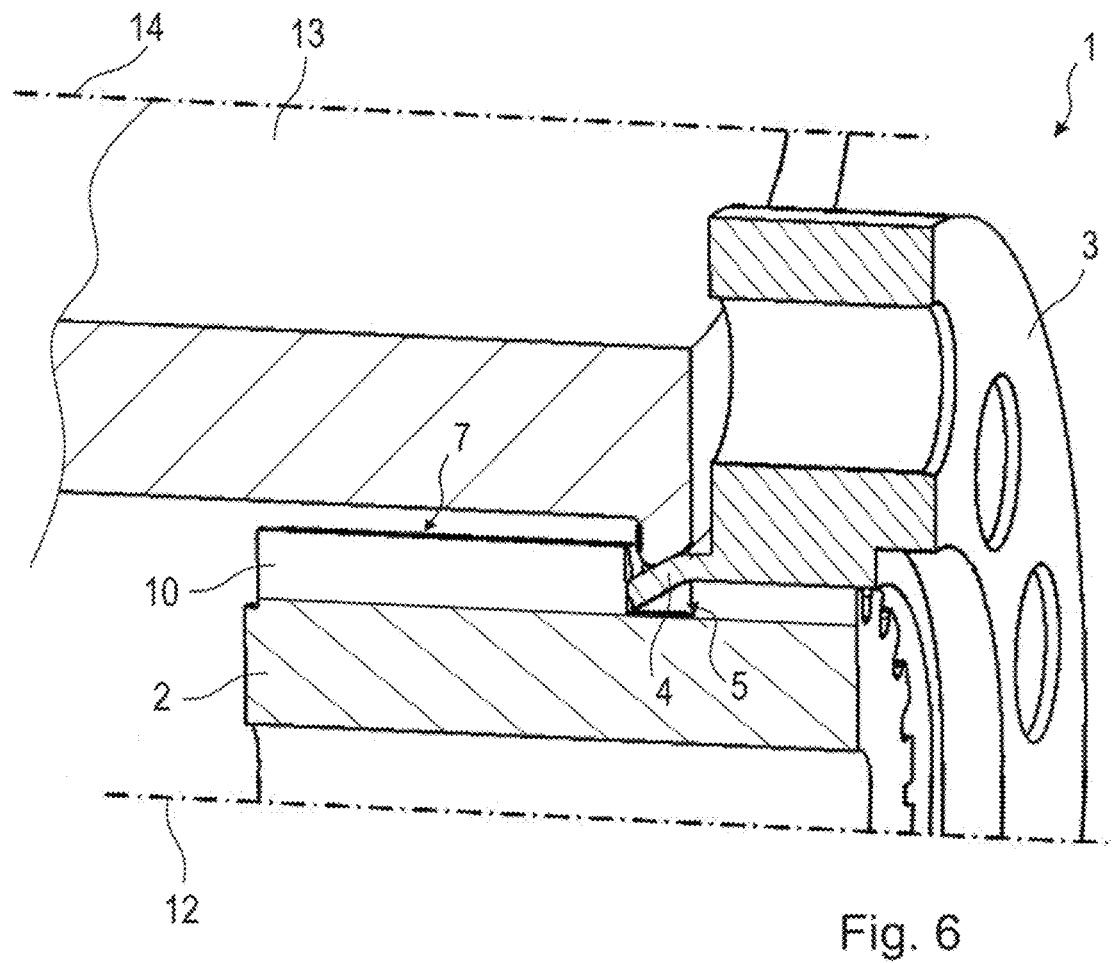
FIG. 6 shows a longitudinal section through the sun gear according to FIG. 5 and an associated planet carrier in the assembled state, the final deformation step carried out by means of a rolling cylinder being additionally shown.

FIGS. 5 and 6 show an alternative embodiment, in which the circumferentially extending groove 5 directly adjoins the running area 7 of the sun gear 2 in an axial direction.

Figure 7:
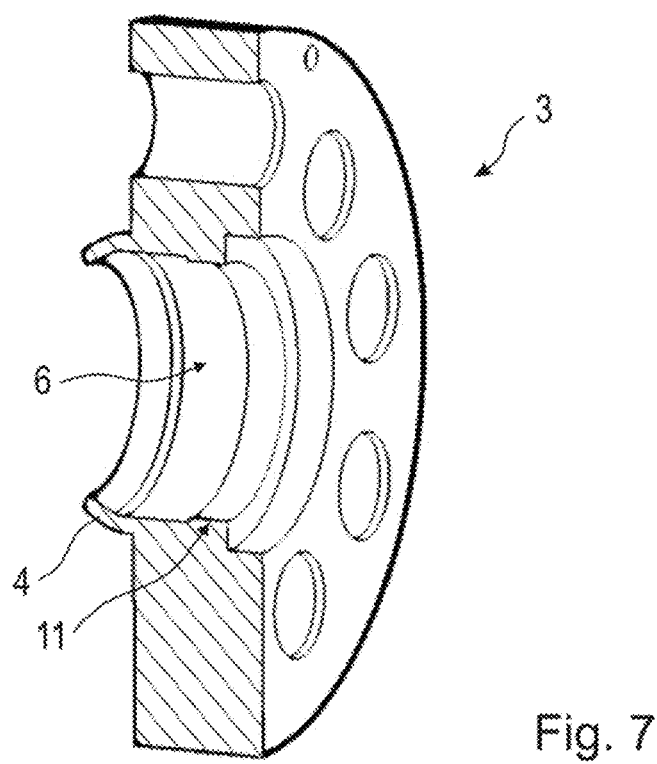
FIG. 7 shows a longitudinal section through a planet carrier suitable for use with the sun gear according to FIG. 5 and provided with an additional taper in the area of the bore according to a third embodiment of the present invention.
Figure 8:
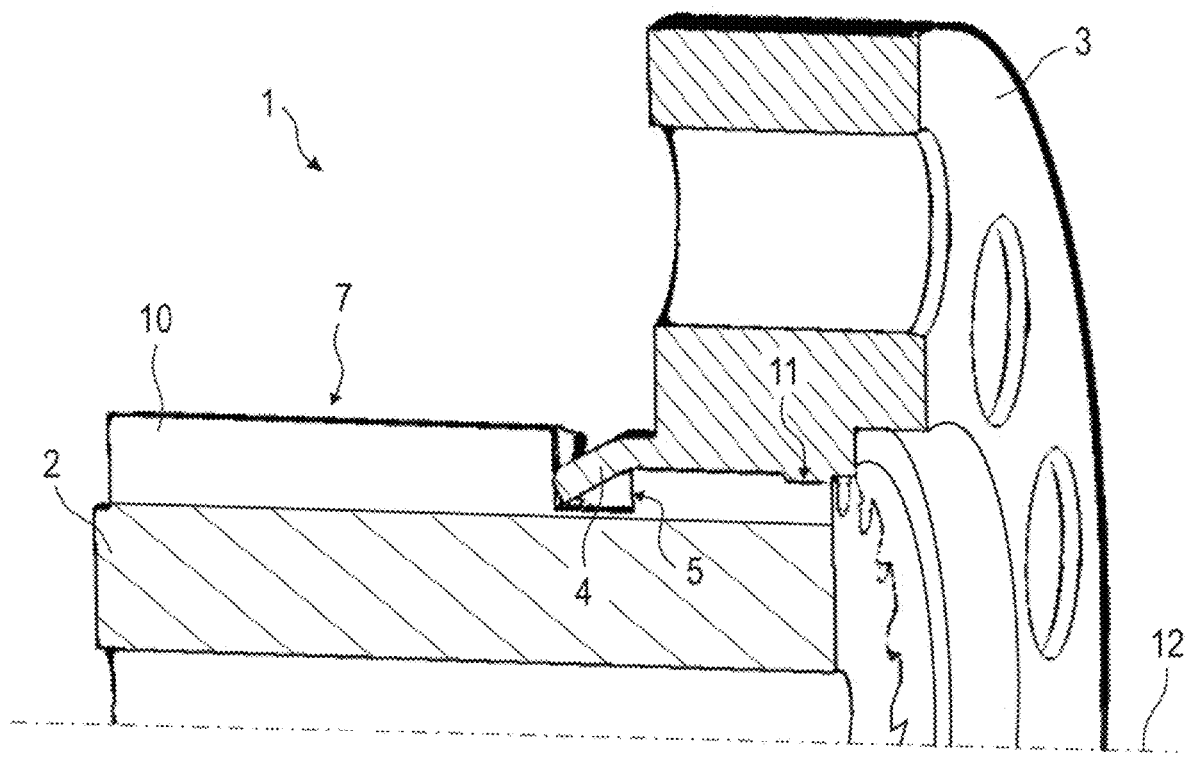
FIG. 8 shows a longitudinal section through the planet carrier according to FIG. 7 and an associated sun gear in the assembled and fully joined state.

FIG. 7 shows an associated planet carrier 3, whose bore 6 has a taper 11, which, when the sun gear 2 and the planet carrier 3 are being joined, as shown in FIG. 8, provides an additional form-fit in the area of the bore 6 and of the shaft area 8, respectively. Reference is made to the fact that the hollow-cylindrical projection 4 is already shown in the deformed state in this representation.

Figure 9:
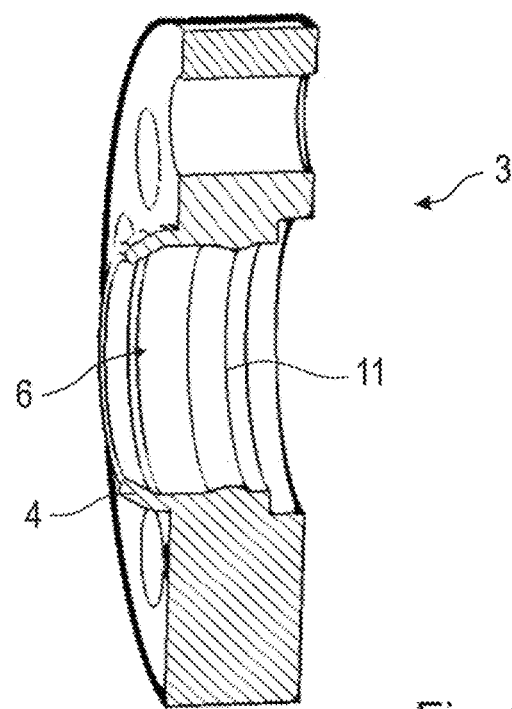
FIG. 9 shows a longitudinal section through a planet carrier according to a modification of the embodiment of FIG. 7.

Finally, FIG. 9 shows a modification of the planet carrier 3 according to FIG. 7 with a double-conical taper 11, which allows the shaft area 8 of the sun gear 2 to be more easily pressed into the bore 6.

LIST OF REFERENCE NUMERALS

1 composite
2 sun gear
3 planet carrier
4 lug/hollow-cylindrical projection
5 recess/groove
6 bore
7 running area
8 shaft area
9 shoulder
10 toothing
11 taper
12 axis
13 rolling cylinder
14 axis of the rolling cylinder

The invention claimed is:

1. A method of manufacturing a composite having a sun gear and a planet carrier for a planetary gear unit, the method comprising:
   manufacturing the sun gear and the planet carrier as two separate components; and
   joining together the two components by establishing, by deformation, a form-fit connection between the two components;
   manufacturing one of the two components with a lug; manufacturing the other one of the two components with a recess, the lug of the one component being, by deformation, at least partially deformed into the recess of the other component, so as to establish the form-fit connection between the two components, wherein
   the recess is manufactured as a circumferentially extending groove, the component provided with the circumferentially extending groove being inserted into a bore of the other component, and the lug of the one component being then, at least partially, deformed into the groove.

2. The method according to claim 1, wherein the deformation takes place by roller burnishing.

3. The method according to claim 1, wherein, in addition to the form-fit connection, a force-fit connection is established between the two components as a press-fit connection.

4. The method according to claim 1, comprising:
   manufacturing the planet carrier with the bore; and
   manufacturing the sun gear with the circumferentially extending groove, the sun gear having a running area provided with a toothing and a shaft area, which exists axially outside of the running area and which is configured and adapted to be inserted into the bore of the planet carrier, the groove being formed in the shaft area.

5. The method according to claim 4, comprising:
   forming the circumferentially extending groove in the shaft area of the sun gear directly adjacent the toothed running area of the sun gear.

6. The method according to claim 4, wherein the shaft area has a smaller external diameter than the running area, the circumferentially extending groove being formed in the shaft area of the sun gear in spaced relationship with the running area of the sun gear, so that a shoulder is formed between the groove and the running area, and the two components being assembled such that the lug of the planet carrier extends up to the shoulder and covers the shoulder at least partially.

7. The method according to claim 1, comprising:
   manufacturing the sun gear initially with a toothing provided continuously in an axial direction, the groove being then formed in the sun gear such that the toothing partially continues to exist on a bottom of the groove, the lug of the planet carrier being deformed into the groove in such a way that a form-fit connection is established between the toothing on the bottom of the groove and the lug.

8. The method according to claim 1, comprising:
   manufacturing the sun gear initially with a toothing provided continuously in an axial direction, the toothing continuing to exist, at least partially, in a shaft area, and the lug of the planet carrier being deformed in such a way that a form-fit connection is established between the toothing in the shaft area and the lug.

9. The method according to claim 4, wherein a shaft area is provided with micro-form-fit elements.

10. The method according to claim 1, wherein the lug is a hollow-cylindrical projection of the planet carrier, which is circumferentially deformed into a groove of the sun gear.

11. The method according to claim 1, comprising:
    dimensioning the bore and a shaft area such that, when the two components are being assembled, a press-fit connection will be established between the bore and a shaft area.

12. The method according to claim 1, comprising:
configuring the bore such that it has at least one taper, whose minimum internal diameter is smaller than an external diameter of a shaft area of the sun gear.

13. A composite comprising:
a sun gear and a planet carrier,
wherein the sun gear and the planet carrier are manufactured as two separate components; and
joined together by a form-fit connection between the two components, the form-fit connection formed by deformation;
wherein one of the two components has a lug,
the other one of the two components has a recess, the lug of the one component being, by deformation, at least partially deformed into the recess of the other component, so as to establish the form-fit connection between the two components, and
the recess is a circumferentially extending groove, the component provided with the circumferentially extending groove being inserted into a bore of the other component, and the lug of the one component being then, at least partially, deformed into the groove.

14. The method according to claim 2, wherein, in addition to the form-fit connection, a force-fit connection is established between the two components as a press-fit connection.

15. The composite according to claim 13, wherein, in addition to the form-fit connection, a force-fit connection is established between the two components as a press-fit connection.

16. The composite according to claim 13, wherein,
The planet carrier has the bore; and
the sun gear has the circumferentially extending groove, the sun gear having a running area provided with a toothing and a shaft area, which exists axially outside of the running area and which is configured and adapted to be inserted into the bore of the planet carrier, the groove being formed in the shaft area.

17. The composite according to claim 16, wherein
the circumferentially extending groove is arranged in the shaft area of the sun gear directly adjacent the toothed running area of the sun gear.

18. The composite according to claim 16, wherein the shaft area has a smaller external diameter than the running area, the circumferentially extending groove being formed in the shaft area of the sun gear in spaced relationship with the running area of the sun gear, so that a shoulder is formed between the groove and the running area, and the two components being assembled such that the lug of the planet carrier extends up to the shoulder and covers the shoulder at least partially.

19. The composite according to claim 16, wherein a shaft area is provided with micro-form-fit elements.

20. The composite according to claim 13, wherein the lug is a hollow-cylindrical projection of the planet carrier, which is circumferentially deformed into a groove of the sun gear.

* * * * *